United States Patent
Zhang et al.

(10) Patent No.: US 10,638,504 B2
(45) Date of Patent: Apr. 28, 2020

(54) DATA PULL-UP METHOD IN WHICH UPLINK CHANNEL IS DYNAMICALLY ALLOCATED AND COMMUNICATION DEVICE

(71) Applicant: HYTERA COMMUNICATIONS CORP., LTD., Shenzhen, Guangdong (CN)

(72) Inventors: Yingzhe Zhang, Shenzhen (CN); Guowen Wu, Shenzhen (CN); Samuel Chia Han Siong, Shenzhen (CN)

(73) Assignee: Hytera Communications Corporation Limited, Guangdong (CN)

( * ) Notice: Subject to any disclaimer, the term of this patent is extended or adjusted under 35 U.S.C. 154(b) by 87 days.

(21) Appl. No.: 15/776,543

(22) PCT Filed: Nov. 16, 2015

(86) PCT No.: PCT/CN2015/094660
§ 371 (c)(1),
(2) Date: Oct. 8, 2018

(87) PCT Pub. No.: WO2017/084002
PCT Pub. Date: May 26, 2017

(65) Prior Publication Data
US 2019/0037590 A1    Jan. 31, 2019

(51) Int. Cl.
*H04W 4/20* (2018.01)
*H04W 72/14* (2009.01)
(Continued)

(52) U.S. Cl.
CPC .............. *H04W 72/14* (2013.01); *H04L 5/00* (2013.01); *H04W 48/12* (2013.01); *H04W 72/1268* (2013.01)

(58) Field of Classification Search
CPC .... H04L 5/00; H04W 72/14; H04W 72/1268; H04W 48/12
See application file for complete search history.

(56) References Cited

U.S. PATENT DOCUMENTS

2019/0266330 A1* 8/2019 Thaler, III .......... H04L 63/0227

FOREIGN PATENT DOCUMENTS

CN      103442439 A    12/2013
CN      103476014 A    12/2013
(Continued)

OTHER PUBLICATIONS

International Search Report from PCT/CN2015/094660 dated Jul. 27, 2016.

*Primary Examiner* — Lan-Huong Truong
(74) *Attorney, Agent, or Firm* — Calfee, Halter & Griswold LLP (57) ABSTRACT

Disclosed are a data pull-up method for dynamically allocating an uplink channel, a communication terminal, and a communication device. The method includes: sending, by a communication device, a pull-up signaling to at least one communication terminal, the pull-up signaling comprising an uplink channel, a time slot, and a pull-up policy allocated by the communication device; receiving, by the communication device, data uploaded by the at least one communication terminal using the uplink channel on the time slot according to the pull-up policy, the data comprising feature information of a subsequent pull-up, and the feature information being used for the communication device to adjust at least one of a subsequent pull-up time and a subsequent pull-up policy. By such means, the present invention improves an activation process flow, can greatly increase channel utilization rate and data pull-up capacity, and improves data pull-up use effects.

11 Claims, 6 Drawing Sheets

(51) Int. Cl.
*H04L 5/00* (2006.01)
*H04W 48/12* (2009.01)
*H04W 72/12* (2009.01)

(56) References Cited

FOREIGN PATENT DOCUMENTS

| CN | 103561468 A | 2/2014 |
|---|---|---|
| CN | 2859469 A | 1/2017 |

* cited by examiner

DATA PULL-UP METHOD IN WHICH UPLINK CHANNEL IS DYNAMICALLY ALLOCATED AND COMMUNICATION DEVICE

TECHNICAL FIELD

The present invention relates to the field of wireless communication technologies, and in particular, to a data pull-up method for dynamically allocating an uplink channel and a communication device.

BACKGROUND

Figure 1:
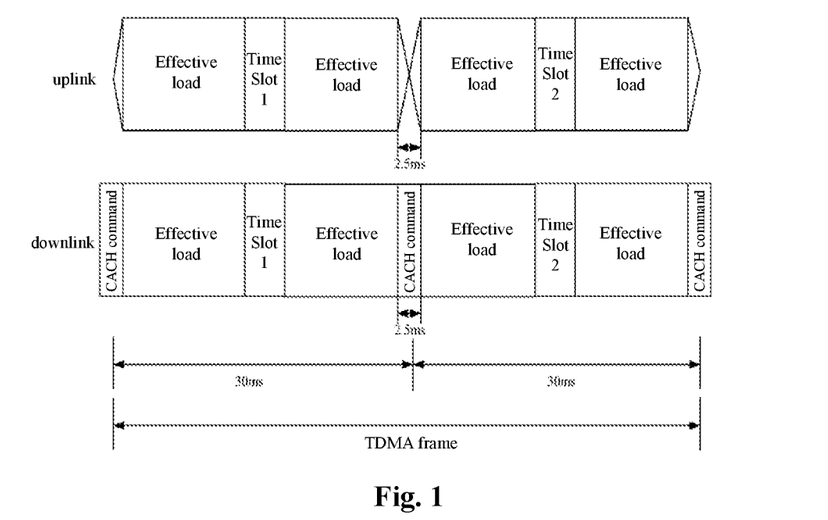
FIG. 1 is a schematic diagram of uplink and downlink frame structures of a TDMA frame in the prior art.

A two time-slot Time Divide Multiple Address (TDMA) frame structure is used in a Digital Mobile Radio/Police Digital Trunking (DMR/PDT) standard meter, which is divided into uplink and downlink directions. Each time slot is 30 ms, one TDMA frame comprises two time slots, and the uplink and downlink frame structures are as shown in FIG. 1. Each downlink TDMA frame has 2.5 ms Trunk Station Control Channel (CACH) signaling in the center, each two downlink TDMA frames form a multi-frame structure, and each multi-frame contains four CACH signaling.

Figure 2:
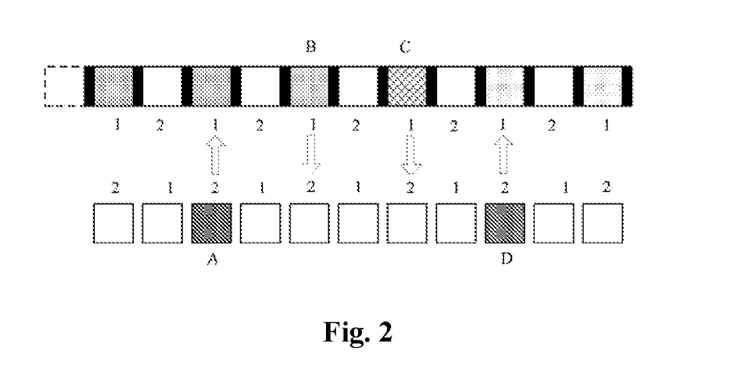
FIG. 2 is a schematic diagram of uplink and downlink working flows of the prior art.

Data pull-up is that a calling party needs to obtain data of a called party, the calling party initiates a request, the called party gives the data, the calling party receives the data, and an uplink communication device sends downlink signaling to a terminal to pull up, and the terminal will reply the data pulled up on next uplink time slot of the same channel. The uplink and downlink workflows of the terminal and the uplink communication device are as shown in FIG. 2. The terminal sends an uplink request at a point A, and the uplink communication device can perform a downlink response at a point B. The uplink communication device sends a downlink request at a point C, and the terminal can perform an uplink response at a point D.

The current data pull-up is that the uplink communication device sends a pull-up request to a target terminal on a fixed channel, and the terminal responds on next time slot of the same channel, and only one-to-one single pull-up mode is supported. The current data pull-up is generally completed through a control channel or another time slot of the same frequency as the control channel.

The current DMR standard only defines the one-to-one single data pull-up method on the control channel. This method will occupy control channel resources of the uplink communication device, has very low transmission efficiency, and is easy to cause control channel congestion, which will affect other services and cannot support large-capacity and high-frequency data pull-up services. Other existing pull-up schemes can only support that the entire pull-up and reply process are completed on the same channel and time slot, and cannot be dynamically adjusted. Only one terminal can be pulled up at a time and the data is uploaded once. It is not flexible enough to use and the entire channel utilization rate and the pull-up capacity are not high enough.

The communication capacity bottleneck of the current cluster system control channel has become the bottleneck of the terminal access capacity. Especially in applications that need to support large-capacity and high-frequency data pull-up, the communication capability of the control channel seriously affects the number of access terminals. Moreover, the current channel resources are very expensive and scarce, and more optimal allocation and use of limited channel resources are necessary.

SUMMARY

The embodiments of the present invention provide a data pull-up method for dynamically allocating an uplink channel and a communication device, which can greatly improve the channel utilization rate and data pull-up capacity, and improve the data pull-up use effects.

The present invention provides a data pull-up method for dynamically allocating an uplink channel, comprising: sending, by a communication device, a pull-up signaling to at least one communication terminal, the pull-up signaling comprising an uplink channel, a time slot, and a pull-up policy allocated by the communication device; and receiving, by the communication device, data uploaded by the communication terminal using the uplink channel on the time slot according to the pull-up policy, the data comprising feature information of a subsequent pull-up, and the feature information being used for the communication device to adjust at least one of a subsequent pull-up time and a subsequent pull-up policy.

The pull-up policy comprises single and multiple upload policies, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

When the multiple upload policy is the first multiple upload policy, the pull-up signaling comprises upload multi-frames and time slot numbers allocated by the communication device and respectively corresponding to the multiple communication terminals, and the step of the sending, by a communication device, a pull-up signaling to at least one communication terminal specifically comprises: sending, by the communication device, the upload multi-frames and the time slot numbers allocated by the communication device to each of the communication terminals, so that each of the communication terminals determine pull-up time according to a current multi-frame and the upload multi-frames and the time slot numbers allocated by the communication device.

When the multiple upload policy is the second multiple upload policy, the pull-up signaling comprises an upload number of times and an upload period; and the step of the receiving, by the communication device, data uploaded by the at least one communication terminal using the uplink channel on the time slot according to the pull-up policy specifically comprises: receiving, by the communication device, the data automatically uploaded by the communication terminal on the uplink channel according to the upload period until the upload number of times is reached.

The method comprises: adjusting, by the communication device, at least one of the pull-up time and the pull-up policy; and sending, by the communication device, a new pull-up signaling to the communication terminal, the new pull-up signaling comprising an uplink channel re-allocated by the communication device and at least one of the pull-up time and the pull-up policy adjusted, so that the communication terminal uploads the data according to the re-allocated uplink channel and at least one of the pull-up time and the pull-up policy adjusted.

The adjusting, by the communication device, at least one of the pull-up time and the pull-up policy comprising: receiving, by the communication device, the data uploaded by the communication terminal comprising feature information of increasing the pull-up frequency or decreasing the pull-up frequency, and dynamically adjusting at least one of the subsequent pull-up time and the subsequent pull-up policy according to the feature information; or, detecting, by the communication device, that the uplink channel resources become busy or idle, and dynamically adjusting at least one of the subsequent pull-up time and the subsequent pull-up policy according to the uplink channel resource changes.

The present invention further provides a data pull-up method for dynamically allocating an uplink channel, comprising: receiving, by a communication terminal, a pull-up signaling sent by a communication device, the pull-up signaling comprising an uplink channel, a time slot, and a pull-up policy allocated by the communication device; and responding to, by the communication terminal, the pull-up signaling and uploading data to the communication device using the uplink channel on the time slot according to the pull-up policy, the data comprising feature information of a subsequent pull-up, so that the communication device adjusts at least one of a subsequent pull-up time and a subsequent pull-up policy according to the feature information.

The pull-up policy comprises a multiple upload policy, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

When the multiple upload policy is the first multiple upload policy, the pull-up signaling further comprises upload multi-frames and time slot numbers allocated by the communication device and respectively corresponding to the multiple communication terminals; and the step of the receiving, by the communication terminal, a pull-up signaling sent by the communication device specifically comprises: receiving, by the communication terminal, the upload multi-frames and the time slot numbers allocated by the communication device; and the step of the responding to, by the communication terminal, the pull-up signaling and uploading data to the communication device using the uplink channel on the time slot according to the pull-up policy specifically comprises: determining, by the communication terminal, the pull-up time according to a current multi-frame and the upload multi-frames and the time slot numbers allocated.

When the multiple upload policy is the second multiple upload policy, the pull-up signaling further comprises an upload number of times and an upload period; and the step of the uploading, by the communication terminal, data to the communication device using the uplink channel on the time slot according to the pull-up policy specifically comprises: uploading, by the communication terminal, the data to the communication device automatically on the uplink channel according to the upload period until the upload number of times is reached.

The uploading, by the communication terminal, data to the communication device using the uplink channel on the time slot according to the pull-up policy comprises: receiving, by the communication terminal, a new pull-up signaling sent by the communication device, the new pull-up signaling comprising a re-allocated uplink channel and an adjusted pull-up policy; and uploading, by the communication terminal, the data to the communication device according to the re-allocated uplink channel and the adjusted pull-up policy.

The feature information is obtained according to a moving speed of the communication terminal.

The present invention further provides a communication device, comprising: a sending module, configured to send a pull-up signaling to at least one communication terminal, the pull-up signaling comprising an uplink channel, a time slot, and a pull-up policy allocated by the communication device; and a first receiving module, connected with the sending module, configured to receive data uploaded by the at least one communication terminal using the uplink channel on the time slot according to the pull-up policy, the data comprising feature information of a subsequent pull-up, and the feature information being used for the communication device to adjust at least one of a subsequent pull-up time and a subsequent pull-up policy.

The communication device further comprises an adjusting module, and the adjusting module is configured to adjust at least one of a pull-up time and a pull-up policy; and the sending module is further configured to: send a new pull-up signaling to the communication terminal, the new pull-up signaling comprising an uplink channel re-allocated by the communication device and at least one of the pull-up time and the pull-up policy adjusted, so that the communication terminal uploads the data according to the re-allocated uplink channel and at least one of the pull-up time and the pull-up policy adjusted.

The communication device further comprises a detecting module, wherein before the adjusting module is configured to adjust at least one of the pull-up time and the pull-up policy, the data uploaded by the communication terminal received by the first receiving module comprises feature information of increasing the pull-up frequency or decreasing the pull-up frequency; or, the detecting module detects that the uplink channel resources become busy or idle.

The present invention further provides a communication terminal, comprising: a second receiving module, configured to receive a pull-up signaling sent by a communication device, the pull-up signaling comprising an uplink channel, a time slot, and a pull-up policy allocated by the communication device; and a response module, connected to the second receiving module and configured to respond to the pull-up signaling, and upload data to the communication device using the uplink channel on the time slot according to the pull-up policy, the data comprising feature information of a subsequent pull-up, so that the communication device adjusts at least one of a subsequent pull-up time and a subsequent pull-up policy.

The present invention further provides a communication device, comprising: a receiver, a processor, a sender and a data bus, wherein the receiver, the processor and the sender are connected through the data bus for mutual communication; the sender is configured to send a pull-up signaling to at least one communication terminal, the pull-up signaling comprising an uplink channel, a time slot, and a pull-up policy allocated by the communication device; the processor is configured to generate the pull-up signaling; and the receiver is configured to receive data uploaded by the at least one communication terminal using the uplink channel on the time slot according to the pull-up policy, the data comprising feature information of a subsequent pull-up, and the feature information being used for the communication device to adjust at least one of the subsequent pull-up time and the subsequent pull-up policy.

The pull-up policy comprises a multiple upload policy, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

The present invention further provides a communication terminal, comprising: a transceiver, a processor and a data bus, wherein the transceiver and the processor are connected through the data bus for mutual communication; the transceiver is configured to receive a pull-up signaling sent by a communication device, the pull-up signaling comprising an uplink channel, a time slot, and a pull-up policy allocated by the communication device; and the processor is configured to respond to the pull-up signaling and upload data to the communication device using the uplink channel on the time slot according to the pull-up policy, the data comprising feature information of a subsequent pull-up, so that the communication device adjusts at least one of a subsequent pull-up time and a subsequent pull-up policy according to the feature information.

The pull-up policy comprises a multiple upload policy, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

Through the above solution, the beneficial effects of the present invention are as follows: the present invention sends the pull-up signaling to at least one communication terminal through the communication device, the pull-up signaling comprising the uplink channel, the time slot, and the pull-up policy allocated by the communication device; and the communication device receives the data uploaded by the at least one communication terminal using the uplink channel on the time slot according to the pull-up policy, the data comprising the feature information of the subsequent pull-up, and the feature information being used for the communication device to adjust at least one of the subsequent pull-up time and the subsequent pull-up policy, which can greatly improve the channel utilization rate and data pull-up capacity, and improve the data pull-up use effects.

BRIEF DESCRIPTION OF THE DRAWINGS

In order to illustrate the technical solutions in the embodiments of the present invention more clearly, the drawings used in the description of the embodiments will be briefly described below. Obviously, the drawings in the following description are merely some embodiments of the present invention. For those of ordinary skills in the art, other drawings may also be obtained based on these drawings without any creative work. Wherein.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. Based on the embodiments of the present invention, all other embodiments obtained by those of ordinary skills in the art without going through any creative work shall fall within the scope of protection of the present invention.

Figure 3:
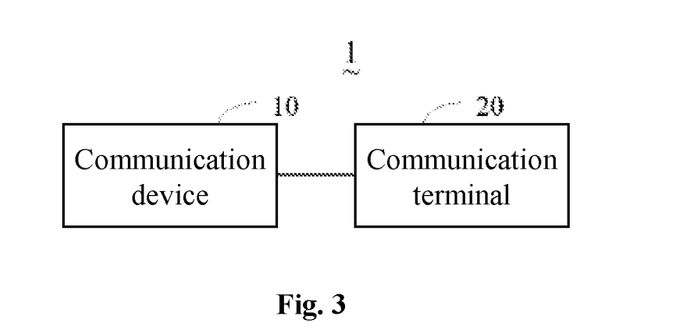
FIG. 3 is a structural schematic diagram of a data pull-up system for dynamically allocating an uplink channel according to an embodiment of the present invention.

Referring to FIG. 3, which is a structural schematic diagram of a data pull-up system for dynamically allocating an uplink channel according to an embodiment of the present invention. As shown in FIG. 3, the data pull-up system 1 for dynamically allocating an uplink channel comprises a communication device 10 and a communication terminal 20. The communication device 10 sends a pull-up signaling to at least one communication terminal 20, the pull-up signaling comprising an uplink channel, a time slot, and a pull-up policy allocated by the communication device 10. The at least one communication terminal 20 uploads data to the communication device 10 using the uplink channel on the time slot according to the pull-up policy. The data comprises feature information of a subsequent pull-up, and the feature information is used for the communication device 10 to adjust at least one of the subsequent pull-up time and the subsequent pull-up policy. The uplink channel may be any idle channel in the current system 1.

The present invention is applicable to the pull-up of data in any type, and may also be applied to any digital standard of a TDMA system. For ease of explanation, all subsequent data pull-ups based on the DMR and PDT standards are taken as examples, but the present invention is not limited to be applied in the DMR and PDT standards. The communication device 10 is a communication device capable of providing a downlink service, and may preferably be a relay station, a base station, or the like. The communication terminal 20 may be a smartphone, a tablet, a computer, or the like, which are not limited herein.

Optionally, the pull-up policy comprises at least one of a single upload policy and a multiple upload policy. The single upload policy is that the communication device 10 only pulls up data of one communication terminal 20 once, that is, the communication device 10 sends the pull-up signaling once, and one communication terminal 20 uploads data to the communication device 10 according to the pull-up signaling. Since the pull-up data needs to occupy downlink resources, and the downlink resources of a current downlink channel are limited, only the communication terminal 20 staying on the current downlink channel can be pulled up, which greatly limits the pull-up capacity of the entire system.

Optionally, the multiple upload policy comprises at least one of a first multiple upload policy and a second multiple upload policy.

If the number of the current downlink channel communication terminals 20 exceeds the maximum pull-up capacity that the downlink resources can support, the communication device 10 can adjust the pull-up policy to the first multiple upload policy. The first multiple upload policy is that the communication device 10 sends a pull-up signaling once, and multiple communication terminals 20 upload data to the communication device 10 according to the pull-up signaling, i.e., one group of communication terminals is pulled up in the meanwhile. When the pull-up policy is the first multiple upload policy, the communication device 10 allocates a unique upload multi-frame and a time slot number for each communication terminal 20 in the group in advance. A destination address of the pull-up signaling is a group address. After the communication terminal 20 receives the pull-up signaling, each communication terminal 20 determines the unique pull-up time according to the current multi-frame and the allocated upload multi-frame and the time slot number, and then switches to the allocated uplink channel to automatically upload the data. Each upload multi-frame comprises multiple time slots. If the communication terminal 20 directly uploads data on a time slot next to the time slot receiving the pull-up signaling, then a unique pull-up time may be determined according to the current multi-frame and the allocated upload multi-frames. If the communication terminal 20 does not directly upload the data on the time slot next to the time slot receiving the pull-up signaling, then the communication terminal 20 needs to determine the pull-up time according to the current multi-frame, the allocated upload multi-frames and the time slot numbers.

Figure 4:
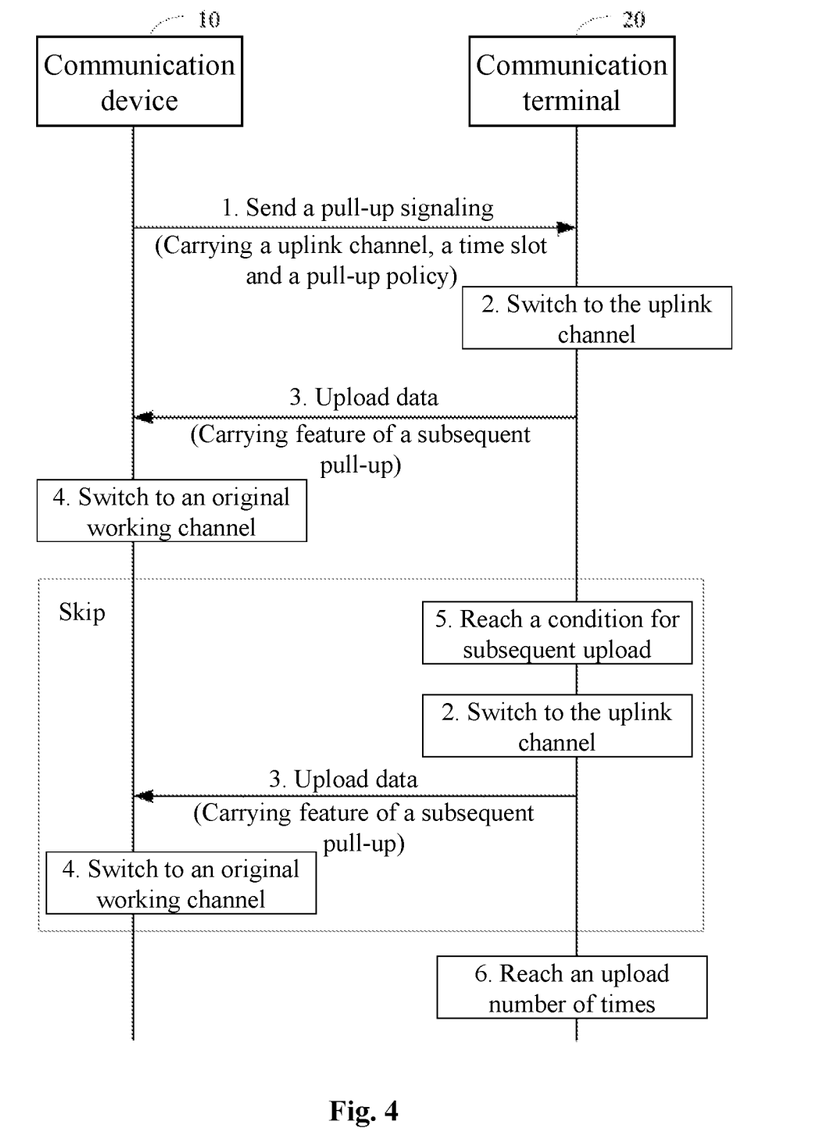
FIG. 4 is a schematic diagram of a method for a second multiple pull-up policy according to an embodiment of the present invention.

In order to further increase the pull-up capacity and reduce the invalid occupancy of the downlink resources, the communication device 10 adjusts the pull-up policy to the second multiple pull-up policy. The second multiple upload policy is that the communication device 10 sends a pull-up signaling once, and at least one communication terminal 20 uploads data to the communication device 10, i.e., once pull-up is performed while the data is uploaded for multiple times. When the pull-up policy is the second multiple upload policy, the pull-up signaling sent by the communication device 10 comprises an upload number of times and an upload period. The communication terminal 20 automatically uploads the data on the uplink channel of the communication device 10 according to the upload period until the upload number of times is reached, then automatically stops uploading, and waits for next pull-up signaling. Specifically, a method for implementing the second multiple upload policy is as shown in FIG. 4.

Step 1: the communication device 10 sends a pull-up signaling to the communication terminal 20. The pull-up signaling carries an uplink channel, a time slot, and a pull-up policy allocated by the communication device 10, as well as the upload period and the upload number of times.

Step 2: the communication terminal 20 switches to an uplink channel allocated by the communication device 10.

Step 3: the communication terminal 20 uploads data to the communication device 10, the data comprising feature information of a subsequent pull-up. The feature information may assist the communication device 10 in determining at least one of a subsequent pull-up time and a subsequent pull-up policy.

Step 4: switch back to an original working channel.

Step 5: reach a condition for subsequent upload. When the communication terminal 20 determines that the condition for subsequent upload is satisfied, steps 2-4 are repeated to continue uploading data to the communication device 10.

Step 6: reach the upload number of times. When the data uploaded by the communication terminal 20 to the communication device 10 reaches the upload number of times, then the communication terminal 20 stops uploading and waits for next pull-up signaling.

The second multiple upload policy is that the communication device 10 sends the pull-up signaling once, and multiple communication terminals 20 upload the data to the communication device 10 for multiple times.

Compared with the situation that when the communication device in the prior art sends pull-up signaling once, one corresponding communication terminal only uploads data once to the communication device, the embodiment of the present invention adjusts the pull-up policy to the multiple upload policy, that is, the communication device sends the pull-up signaling once, corresponding to the multiple communication terminals uploading data to the communication device, or at least one communication terminal uploading data to the communication device for multiple times, the number of the pull-up signaling that the communication device needs to transmit is greatly reduced; therefore, the occupation of the downlink resources can be reduced, and the pull-up capacity can be improved.

For example, a minimum sending time unit of the communication terminal 20 is one time slot, and one time slot is 30 ms in the DMR and PDT standards. Within one minute, it can pull up 2000 times (60 s/30 ms) on one physical carrier channel. Assuming that the communication device 10 can completely send the pull-up signaling in one time slot, and the communication terminal 20 can completely upload the data in one time slot at the same time, the data uploaded by 2000 communication terminals 20 can be pulled up on one uplink channel. That is, theoretically, if a data pull-up interval is one minute, the data of a maximum of 2000 communication terminals data can be pulled up on one physical carrier channel. If a data pull-up interval is 6 s, the data of a maximum of 200 communication terminals data can be pulled up on one physical carrier channel. If a data pull-up interval is 1 s, the data of a maximum of 32 communication terminals data can be pulled up on one physical carrier channel.

If only one time slot logical channel of one physical carrier is used, then the number of the above communication terminals that can be pulled up is halved. If there is one channel (one time slot logical channel) that can be used for pull-up in the current system 1, and the data pull-up interval is 6 s, then a maximum of 100 communication terminals 20 can be supported during one-to-one single pull-up.

When it is necessary to support the pull-up of a larger number of communication terminals 20, it can be achieved by only adjusting the pull-up period or the pull-up policy. When adjusting the pull-up period, for each additional communication terminal 20, the pull-up interval needs to be increased by 60 ms. When the pull-up period is increased to 6×N seconds, 100×N communication terminals 20 can be supported. When the pull-up policy is adjusted to the second multiple pull-up policy which is one pull-up and multiple times of upload, then pull up of 100×N communication terminals can be supported. When the pull-up policy is adjusted to be the first multiple pull-up policy, if there are N groups in the current channel and there are M communication terminals 20 in each group, then the pull up of 100× N×M communication terminals 20 can be supported.

All the multiple pull-up policies require a relatively long time for the communication terminal 20 to completely upload all the data. If the current uplink channel needs to be occupied by other high-priority services during this process, the communication device 10 will re-allocate the uplink channel and adjust the pull-up policy according to the current uplink channel resource changes. That is, the communication device 10 will adjust at least one of the pull-up time and the pull-up policy. The communication device 10 sends a new pull-up signaling to the communication terminal 20, the new pull-up signaling comprising an uplink channel re-allocated by the communication device 20 and at least one of the pull-up time and the pull-up policy adjusted, so that the communication terminal 20 uploads the data according to the re-allocated uplink channel and at least one of the pull-up time and the pull-up policy adjusted. If the communication terminal 20 receives the new pull-up signaling sent by the communication device 10 during the upload process, it needs to immediately stop uploading the current data and automatically upload the data according to the new pull-up policy. The new pull-up signaling sent by the communication device 10 may be a pull-up policy adjustment for a certain communication terminal 20 or may be a pull-up policy adjustment for multiple communication terminals 20.

Optionally, the communication device 10 adjusts at least one of the pull-up time and the pull-up policy, comprising: the data uploaded by the communication terminal received by the communication device 10 comprising feature information of increasing the pull-up frequency or decreasing the pull-up frequency, and dynamically adjusting at least one of the subsequent pull-up time and the subsequent pull-up policy according to the feature information; or, the communication device 10 detecting that the uplink channel resources become busy or idle, and dynamically adjusting at least one of the pull-up time and the pull-up policy according to the uplink channel resource changes. Any idle uplink channel can be allocated for the communication terminal 20 to upload data. When the communication device 10 detects that the available uplink channel resources are sufficient, it indicates that data pull-up with a relatively high frequency can be supported. When the communication device 10 detects that the available uplink channel resources are insufficient, it indicates that the pull-up frequency needs to be temporarily decreased to ensure that all the communication terminals 20 in the system 1 have the opportunity to be pulled up.

Figure 5:
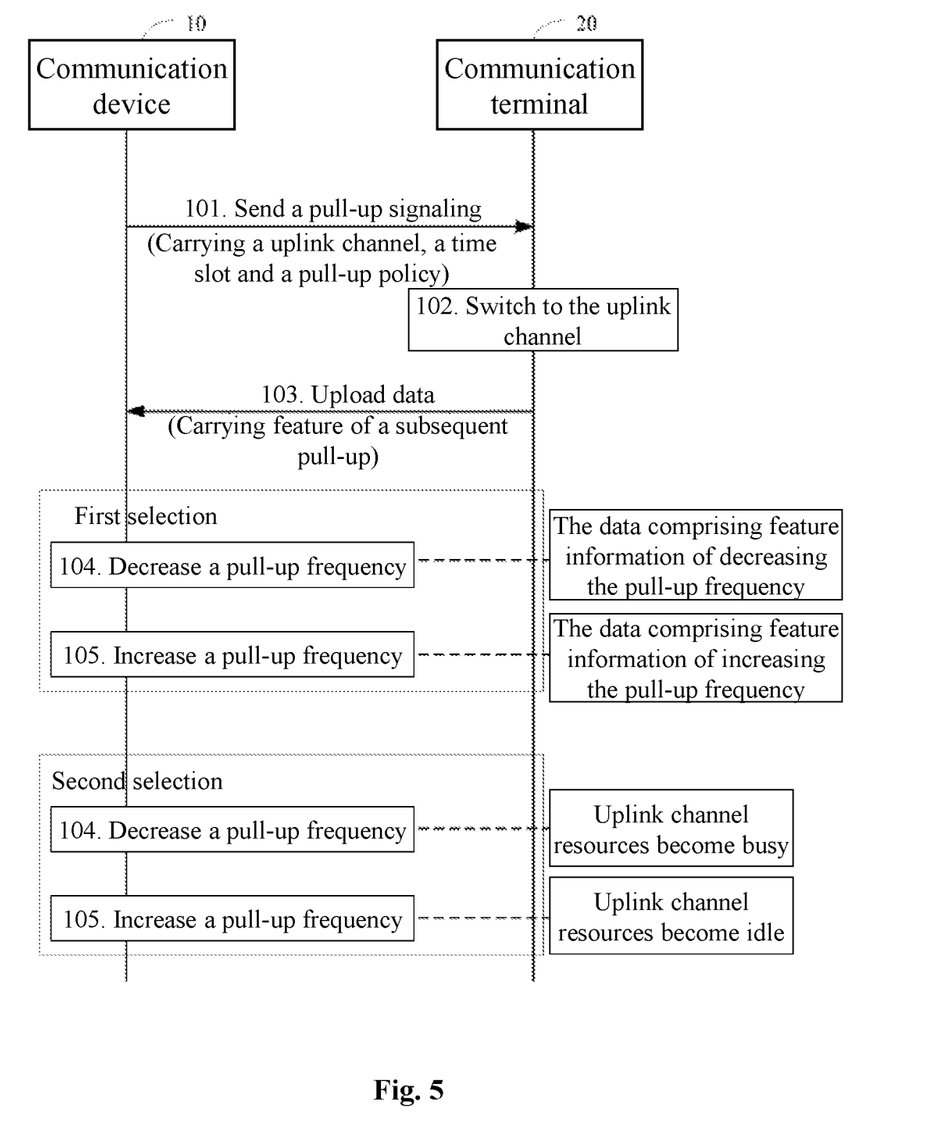
FIG. 5 is a schematic diagram of a method for adjusting a pull-up policy according to an embodiment of the present invention.

Optionally, after the communication device 10 receives the data uploaded by the communication terminal 20, it needs to adjust at least one of a subsequent pull-up time and a subsequent pull-up policy according to the feature information in the data. When the data comprises feature information of needing to decrease the pull-up frequency, the communication device 10 appropriately extends the pull-up period; when the data comprises feature information of needing to increase the pull-up frequency, the communication device 10 appropriately shortens the pull-up period. A specific pull-up policy adjustment method is as shown in FIG. 5.

Step 101: the communication device 10 sends a pull-up signaling to the communication terminal 20. The pull-up signaling comprises an uplink channel, a time slot, and a pull-up policy allocated by the communication device 10.

Step 102: the communication terminal 20 switches to an uplink channel allocated by the communication device 10.

Step 103: the communication terminal 20 uploads data to the communication device 10, the data comprising feature information of a subsequent pull-up. The feature information may assist the communication device 10 in determining at least one of a subsequent pull-up time and a subsequent pull-up policy.

In the process of uploading data by the communication terminal 20, the communication device 10 may adjust the pull-up policy according to the actual situations. Specifically, there are two selection bases: the first selection is to adjust according to the feature information in the received data sent by the communication terminal 20; and the second selection is to adjust according to the network uplink channel resource changes detected by the communication device 10. Specifically, if the data received by the communication device 10 comprises the feature information of decreasing the pull-up frequency or the communication device 10 detects that the uplink channel resources become busy, step 104 is executed to indicate to decrease the pull-up frequency. If the data received by the communication device 10 comprises the feature information of increasing the pull-up frequency or the communication device 10 detects that the uplink channel resources become idle, step 105 is executed to indicate to increase the pull-up frequency.

Step 104: the communication device 10 indicates to decrease the pull-up frequency.

Step 105: the communication device 10 indicates to increase the pull-up frequency.

If the communication terminal 20 receives the new pull-up signaling sent by the communication device 10 during the data upload process, and the new pull-up signaling comprises the adjusted pull-up policy, then it needs to stop uploading the previous data and automatically uploads the data according to the new pull-up policy. The actual pull-up period and the pull-up policy is adjusted according to the current channel resource conditions and the feature information uploaded by the communication terminal so as to minimize the invalid occupation of the uplink channel resources, and further improve the data pull-up use effects.

The feature information can serve as reference information for adjusting at least one of the pull-up time and the pull-up policy. For example, when Global Positioning System (GPS) data is pulled up, speed information in the GPS data can be used as the feature information. If a moving speed of the communication terminal becomes faster, the pull-up period can be increased. If the moving speed of the communication terminal becomes slower, the pull-up period can be decreased. For example, when the status data is pulled up, the pull-up period can be decreased if the status is off duty. If the status is on duty, then the pull-up period can be increased.

If the uploaded data itself does not have the above features that can assist in adjusting at least one of the pull-up time and the pull-up policy, some additional custom pull-up policies can be embedded in the data to adjust the features as feedback, so that the communication terminal 20 can assist the communication device 10 in correcting the pull-up policy by self settings and status. For example, the communication terminal 20 embeds a pre-agreed flag bit field to allow the communication device 10 to increase or decrease the pull-up frequency by judging the flag bit field, so that the communication terminal 20 has the opportunity to autonomously adjust the period and policy being pulled up according to the current status.

Figure 6:
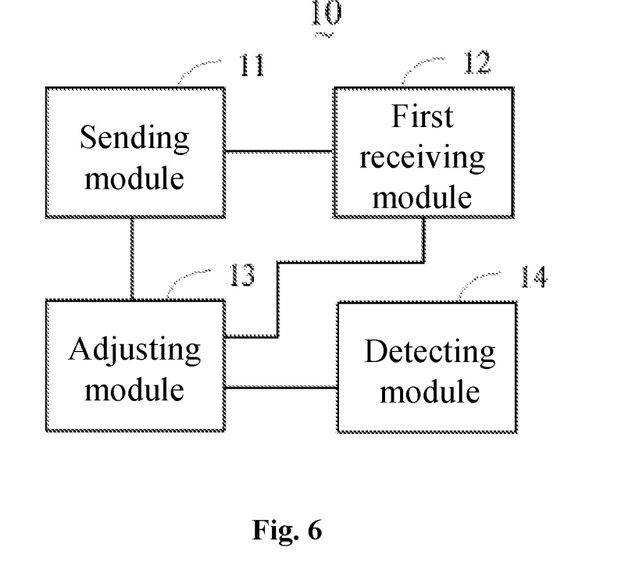
FIG. 6 is a structural schematic diagram of a communication device according to a first embodiment of the present invention.

FIG. 6 is a structural schematic diagram of a communication device according to a first embodiment of the present invention. As shown in FIG. 6, the communication device 10 comprises: a sending module 11, a first receiving module 12, an adjusting module 13 and a detecting module 14. The sending module 11 is configured to send a pull-up signaling to at least one communication terminal. The pull-up signaling comprises an uplink channel, a time slot, and a pull-up policy allocated by the communication device 10. The first receiving module 12 is connected with the sending module 11 and is configured to receive the data uploaded by the communication terminal using the uplink channel on the time slot according to the pull-up policy. The data comprises feature information of a subsequent pull-up, and the feature information is used for the communication device 10 to adjust at least one of a subsequent pull-up time and a subsequent pull-up policy.

Optionally, the uplink channel may be any idle channel in a current system. The pull-up policy comprises at least one of a single upload policy and a multiple upload policy. The single upload policy is that the communication device 10 only pulls up data of one communication terminal once, that is, the communication device 10 sends the pull-up signaling once, and one communication terminal uploads data to the communication device 10 according to the pull-up signaling.

Optionally, the multiple upload policy comprises at least one of a first multiple upload policy and a second multiple upload policy. The first multiple upload policy is that the communication device 10 sends a pull-up signaling once, and multiple communication terminals upload data to the communication device 10 according to the pull-up signaling, i.e., one group of communication terminals is pulled up in the meanwhile. When the multiple upload policy is the first multiple upload policy, the pull-up signaling further comprises upload multi-frames and time slot numbers allocated by the communication device 10 and respectively corresponding to the multiple communication terminals. The sending module 11 is further configured to: send upload multi-frames and time slot numbers allocated by the communication device 10 to each communication terminal, so that each communication terminal determines the pull-up time according to a current multi-frame and the upload multi-frames and the time slot numbers allocated by the communication device 10, and switches to the allocated uplink channel to automatically upload the data. A destination address of the pull-up signaling is a group address.

The second multiple upload policy is that the communication device 10 sends a pull-up signaling once, and at least one communication terminal uploads data to the communication device 10, i.e., once pull-up is performed while the data is uploaded for multiple times. When the multiple upload policy is the second multiple upload policy, the pull-up signaling comprises an upload number of times and an upload period; and the first receiving module 12 is configured to: receive the data automatically uploaded by the communication terminal on the allocated uplink channel according to the upload period until the upload number of times is reached. The second multiple upload policy may also be that the communication device 10 sends the pull-up signaling once, and multiple communication terminals respectively upload the data to the communication device 10 for multiple times.

In the embodiment of the present invention, the pull-up policy is adjusted to the multiple upload policy, i.e., the communication device 10 sends the pull-up signaling once, corresponding to multiple communication terminals uploading data to the communication device 10, or at least one communication terminal uploading data to the communication device 10 for multiple times, which can greatly reduce the number of pull-up signaling that the communication device 10 needs to transmit, thereby reducing the occupation of downlink resources and improving the pull-up capacity.

If the current uplink channel needs to be occupied by other high-priority services, the communication device 10 will re-allocate the uplink channel and adjust the pull-up policy according to the current uplink channel resource changes. Optionally, the communication device 10 further comprises the adjusting module 13. The adjusting module 13 is configured to adjust at least one of the pull-up time and the pull-up policy. The sending module 11 is further configured to: send a new pull-up signaling to the communication terminal, the new pull-up signaling comprising an uplink channel re-allocated by the communication device 10 and at least one of the pull-up time and the pull-up policy adjusted, so that the communication terminal uploads the data according to the re-allocated uplink channel and at least one of the pull-up time and the pull-up policy adjusted. Before the adjusting module is configured to adjust at least one of the pull-up time and the pull-up policy, the data uploaded by the communication terminal received by the first receiving module 12 comprises feature information of increasing the pull-up frequency or decreasing the pull-up frequency, or the detecting module 14 detects that the uplink channel resources become busy or idle. If the data uploaded by the communication terminal received by an acquisition module 13 comprises the feature information of increasing the pull-up frequency, or the acquisition module 13 detects that the uplink channel resources become idle, then the new pull-up signaling sent by the sending module 11 to the communication terminal comprises a pull-up policy of increasing the pull-up frequency. If the data uploaded by the communication terminal received by the first receiving module 12 comprises the feature information of decreasing the pull-up frequency, or the detecting module 14 detects that the uplink channel resources become busy, then the new pull-up signaling sent by the sending module 11 to the communication terminal comprises a pull-up policy of decreasing the pull-up frequency. In this manner, to adjust the actual pull-up period and the pull-up policy according to the current channel resource conditions and the feature information uploaded by the communication terminal can minimize the invalid occupation of the uplink channel resources, and further improve the data pull-up use effects.

Figure 7:
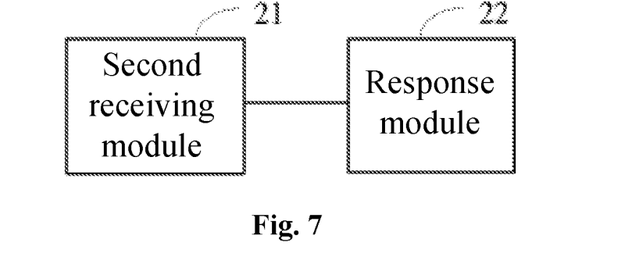
FIG. 7 is a structural schematic diagram of a communication terminal according to the first embodiment of the present invention.

FIG. 7 is a structural schematic diagram of a communication terminal according to the first embodiment of the present invention. As shown in FIG. 7, the communication terminal 20 comprises: a second receiving module 21 and a response module 22. The second receiving module 21 is configured to receive a pull-up signaling sent by a communication device. The pull-up signaling comprises an uplink channel, a time slot, and a pull-up policy allocated by the communication device. The response module 22 is connected with the second receiving module 21 and configured to respond to the pull-up signaling and upload data to the communication device using the uplink channel on the time slot according to the pull-up policy. The data comprises feature information of a subsequent pull-up, so that the communication device adjusts at least one of a subsequent pull-up time and a subsequent pull-up policy according to the feature information.

Optionally, the feature information is obtained according to a moving speed of the communication terminal. For example, if the moving speed of the communication terminal is faster, the feature information may indicate to increase the pull-up period. If the moving speed of the communication terminal becomes slower, the feature information may indicate to decrease the pull-up period. The uplink channel may be any idle channel in a current system. The pull-up policy comprises at least one of a single upload policy and a multiple upload policy. The single upload policy is that the communication device only pulls up data of one communication terminal 20 once, that is, the communication device sends the pull-up signaling once, and one communication terminal 20 uploads data to the communication device according to the pull-up signaling.

Optionally, the multiple upload policy comprises at least one of a first multiple upload policy and a second multiple upload policy, wherein the first multiple upload policy is that the communication device sends the pull-up signaling once, and multiple communication terminals 20 upload the data to the communication device according to the pull-up signaling, i.e., one group of communication terminals 20 is pulled up at the same time. When the multiple upload policy is the first multiple upload policy, the pull-up signaling further comprises upload multi-frames and time slot numbers allocated by the communication device and respectively corresponding to the multiple communication terminals 20. The second receiving module 21 is further configured to: receive the upload multi-frames and the time slot numbers allocated by the communication device. The response module 22 determines the pull-up time according to the current multi-frame and the allocated upload multi-frames and the time slot numbers, and then switches to the allocated channel to automatically upload the data. A destination address of the pull-up signaling is a group address. Each upload multi-frame comprises multiple time slots. If the communication terminal 20 directly uploads data on a time slot next to the time slot receiving the pull-up signaling, then a unique pull-up time may be determined according to the current multi-frame and the allocated upload multi-frames. If the communication terminal 20 does not directly upload the data on the time slot next to the time slot receiving the pull-up signaling, then the communication terminal 20 needs to determine the pull-up time according to the current multi-frame, the allocated upload multi-frames and the time slot numbers.

The second multiple upload policy is that the communication device sends a pull-up signaling once, and at least one communication terminal 20 uploads data to the communication device, i.e., once pull-up is performed while the data is uploaded for multiple times. When the multiple upload policy is the second multiple upload policy, the pull-up signaling further comprises an upload number of times and an upload period. The response module 22 is configured to: automatically upload the data to the communication device on the allocated uplink channel according to the upload period until the upload number of times is reached, then automatically stop uploading, and wait for next pull-up signaling. The second multiple upload policy may also be that the communication device sends the pull-up signaling once, and multiple communication terminals 20 respectively upload the data to the communication device for multiple times.

In the embodiment of the present invention, the pull-up policy is adjusted to the multiple upload policy, i.e., the communication device 20 sends the pull-up signaling once, corresponding to multiple communication terminals uploading data to the communication device 20, or at least one communication terminal uploading data to the communication device 20 for multiple times, which can greatly reduce the number of pull-up signaling that the communication device 10 needs to transmit, thereby reducing the occupation of downlink resources and improving the pull-up capacity.

If the current uplink channel needs to be occupied by other high-priority services, the communication terminal 20 needs to upload data according to the pull-up policy re-adjusted by the communication device. Optionally, the second receiving module 21 is further configured to: receive a new pull-up signaling sent by the communications device. The new pull-up signaling comprises the uplink channel re-allocated by the communication device according to the learned channel resource changes and the adjusted pull-up policy. The response module 22 uploads the data to the communication device according to the re-allocated uplink channel and the adjusted pull-up policy. If the data uploaded last time by the response module 22 comprises feature information of increasing the pull-up frequency, or the communication device detects that the uplink channel resources become idle, then the new pull-up signaling received by the second receiving module 21 comprises a pull-up policy of increasing the pull-up frequency. If the data uploaded last time by the response module 22 comprises feature information of decreasing the pull-up frequency, or the communication device detects that the uplink channel resources become busy, then the new pull-up signaling received by the second receiving module 21 comprises a pull-up policy of decreasing the pull-up frequency. Then, the response module 22 uploads the data to the communication device according to the above pull-up policy. In this manner, to adjust the actual pull-up period and the pull-up policy according to the current channel resource conditions and the feature information uploaded by the communication terminal 20 can minimize the invalid occupation of the uplink channel resources, and further improve the data pull-up use effects.

Figure 8:
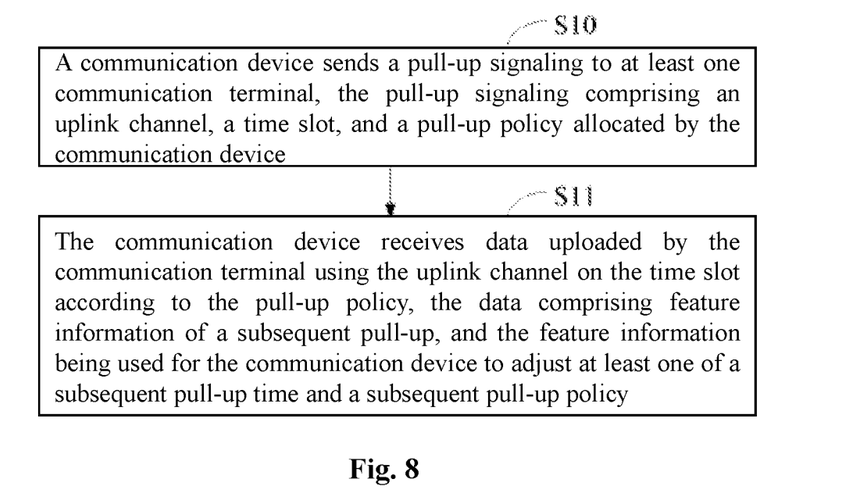
FIG. 8 is a flow diagram of a data pull-up method for dynamically allocating an uplink channel according to the first embodiment of the present invention.

FIG. 8 is a flow diagram of a data pull-up method for dynamically allocating an uplink channel according to a first embodiment of the present invention. As shown in FIG. 8, the data pull-up method for dynamically allocating an uplink channel comprises the followings.

Step S10: the communication device sends a pull-up signaling to at least one communication terminal, the pull-up signaling comprising an uplink channel, a time slot, and a pull-up policy allocated by the communication device.

Optionally, the uplink channel may be any idle channel in a current system. The pull-up policy comprises at least one of a single upload policy and a multiple upload policy. The single upload policy is that the communication device only pulls up data of one communication terminal once, that is, the communication device sends the pull-up signaling once, and one communication terminal uploads data to the communication device according to the pull-up signaling.

Optionally, the multiple upload policy comprises at least one of a first multiple upload policy and a second multiple upload policy. The first multiple upload policy is that the communication device sends a pull-up signaling once, and multiple communication terminals upload data to the communication device according to the pull-up signaling, i.e., one group of communication terminals is pulled up in the meanwhile. The second multiple upload policy is that the communication device sends a pull-up signaling once, and at least one communication terminal uploads data to the communication device, i.e., once pull-up is performed while the data is uploaded for multiple times.

Step S11: the communication device receives data uploaded by the communication terminal using the uplink channel on the time slot according to the pull-up policy, the data comprising feature information of a subsequent pull-up, and the feature information being used for the communication device to adjust at least one of the subsequent pull-up time and the subsequent pull-up policy.

In step S11, when the multiple upload policy is the first multiple upload policy, the pull-up signaling further comprises upload multi-frames and time slot numbers allocated by the communication device and respectively corresponding to the multiple communication terminals. The communication device sends upload multi-frames and time slot numbers allocated by the communication device to each communication terminal, so that each communication terminal determines the pull-up time according to a current multi-frame and the upload multi-frames and the time slot numbers allocated by the communication device, and then switches to the allocated uplink channel to automatically upload the data. A destination address of the pull-up signaling is a group address.

When the multiple upload policy is the second multiple upload policy, the pull-up signaling comprises an upload number of times and an upload period. The communication device receives the data automatically uploaded by the communication terminal on the allocated uplink channel according to the upload period until the upload number of times is reached, automatically stops uploading, and waits for next pull-up signaling. The second multiple upload policy may also be that the communication device sends the pull-up signaling once, and multiple communication terminals respectively upload the data to the communication device for multiple times.

In the embodiment of the present invention, by adjusting the pull-up policy and applying the multiple upload policy, the number of pull-up signaling that the communication device needs to transmit can be greatly reduced, thereby reducing the occupation of downlink resources and improving the pull-up capacity.

If the current uplink channel needs to be occupied by other high-priority services, the communication device will re-allocate the uplink channel and adjust the pull-up policy according to the current uplink channel resource changes. Specifically, the communication device adjusts at least one of the pull-up time and the pull-up policy; and the communication device sending a new pull-up signaling to the communication terminal, the new pull-up signaling comprising an uplink channel re-allocated by the communication device and at least one of the pull-up time and the pull-up policy adjusted, so that the communication terminal uploads the data according to the re-allocated uplink channel and at least one of the pull-up time and the pull-up policy adjusted.

Before the communication device adjusts at least one of the pull-up time and the pull-up policy, the data uploaded by the communication terminal received by the communication device comprises feature information of increasing the pull-up frequency or decreasing the pull-up frequency; or, the communication device detects that the uplink channel resources become busy or idle. Specifically, if the data uploaded by the communication terminal received by the communication device comprises the feature information of increasing the pull-up frequency, or the communication device detects that the uplink channel resources become idle, then the new pull-up signaling sent by the communication device to the communication terminal includes a pull-up policy of increasing the pull-up frequency. If the data uploaded by the communication terminal received by the communication device includes the feature information of decreasing the pull-up frequency, or the communication device detects that the uplink channel resources become busy, then the new pull-up signaling sent by the communication device to at least one communication terminal includes a pull-up policy of decreasing the pull-up frequency. To adjust the actual pull-up period and the pull-up policy by the communication device according to the current channel resource conditions and the feature information uploaded by the communication terminal can minimize the invalid occupation of the uplink channel resources, and further improve the data pull-up use effects.

Figure 9:
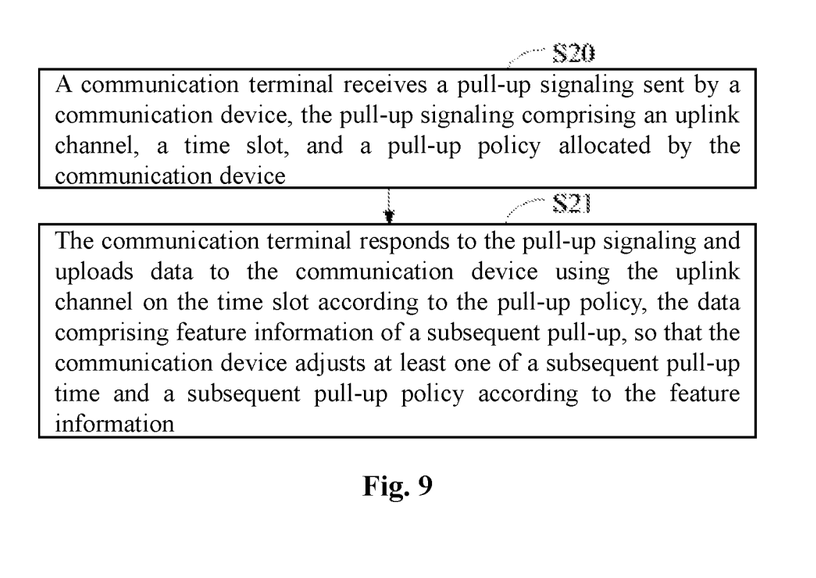
FIG. 9 is a flow diagram of a data pull-up method for dynamically allocating an uplink channel according to a second embodiment of the present invention.

FIG. 9 is a flow diagram of a data pull-up method for dynamically allocating an uplink channel according to a second embodiment of the present invention. As shown in FIG. 9, the data pull-up method for dynamically allocating an uplink channel comprising the followings.

Step S20: a communication terminal receives a pull-up signaling sent by a communication device, the pull-up signaling including an uplink channel, a time slot, and a pull-up policy allocated by the communication device.

Optionally, the uplink channel may be any idle channel in a current system. The pull-up policy comprises at least one of a single upload policy and a multiple upload policy. The single upload policy is that the communication device only pulls up data of one communication terminal once, that is, the communication device 10 sends the pull-up signaling once, and one communication terminal uploads data to the communication device 10 according to the pull-up signaling.

Step S21: the communication terminal responds to the pull-up signaling and uploads data to the communication device using the uplink channel on the time slot according to the pull-up policy, the data comprising feature information of a subsequent pull-up, so that the communication device adjusts at least one of a subsequent pull-up time and a subsequent pull-up policy according to the feature information.

Optionally, the feature information is obtained according to a moving speed of the communication terminal. For example, if the moving speed of the communication terminal is faster, the feature information may indicate to increase the pull-up period. If the moving speed of the communication terminal becomes slower, the feature information may indicate to decrease the pull-up period. The multiple upload policy comprises at least one of a first multiple upload policy and a second multiple upload policy, wherein the first multiple upload policy is that the communication device sends the pull-up signaling once, and multiple communication terminals upload the data to the communication device according to the pull-up signaling, i.e., one group of communication terminals is pulled up at the same time. The second multiple upload policy is that the communication device sends a pull-up signaling once, and at least one communication terminal uploads data to the communication device, i.e., once pull-up is performed while the data is uploaded for multiple times. The second multiple upload policy may also be that the communication device sends the pull-up signaling once, and multiple communication terminals respectively upload the data to the communication device for multiple times.

In the embodiment of the present invention, when the multiple upload policy is the first multiple upload policy, the pull-up signaling further comprises upload multi-frames and time slot numbers allocated by the communication device and respectively corresponding to the multiple communication terminals. The communication terminal receives the upload multi-frames and the time slot numbers allocated by the communication device. The communication terminal determines the pull-up time according to the current multi-frame and the allocated upload multi-frames and the time slot numbers, and then switches to the allocated channel to automatically upload the data. A destination address of the pull-up signaling is a group address. Each upload multi-frame comprises multiple time slots. If the communication terminal directly uploads data on a time slot next to the time slot receiving the pull-up signaling, then a unique pull-up time may be determined according to the current multi-frame and the allocated upload multi-frames. If the communication terminal does not directly upload the data on the time slot next to the time slot receiving the pull-up signaling, then the communication terminal needs to determine the pull-up time according to the current multi-frame, the allocated upload multi-frames and the time slot numbers.

When the multiple upload policy is the second multiple upload policy, the pull-up signaling further comprises an upload number of times and an upload period. The communication terminal automatically uploads the data to the communication device on the allocated uplink channel according to the upload period until the upload number of times is reached, then automatically stops uploading, and waits for next pull-up signaling. In this way, the number of pull-up signaling that the communication device needs to transmit can be greatly reduced, thereby reducing the occupation of downlink resources and improving the pull-up capacity.

If the current uplink channel needs to be occupied by other high-priority services, the communication terminal needs to upload data according to the pull-up policy re-adjusted by the communication device. Optionally, the communication terminal receives a new pull-up signaling sent by the communication device, the new pull-up signaling comprising an uplink channel re-allocated by the communication device according to the learned channel resource changes and an adjusted pull-up policy. The communication terminal uploads the data to the communication device according to the re-allocated uplink channel and the adjusted pull-up policy. Specifically, if the data uploaded last time by the communication terminal comprises feature information of increasing the pull-up frequency, or the communication device detects that the uplink channel resources become idle, then the new pull-up signaling received by the communication terminal comprises a pull-up policy of increasing the pull-up frequency. If the data uploaded last time by the communication terminal comprises feature information of decreasing the pull-up frequency, or the communication device detects that the uplink channel resources become busy, then the new pull-up signaling received by the communication terminal comprising a pull-up policy of decreasing the pull-up frequency. The communication terminal uploads the data to the communication device according to the above pull-up policy. In this manner, to adjust the actual pull-up period and the pull-up policy according to the current channel resource conditions and the feature information uploaded by the communication terminal can minimize the invalid occupation of the uplink channel resources, and further improve the data pull-up use effects.

Figure 10:
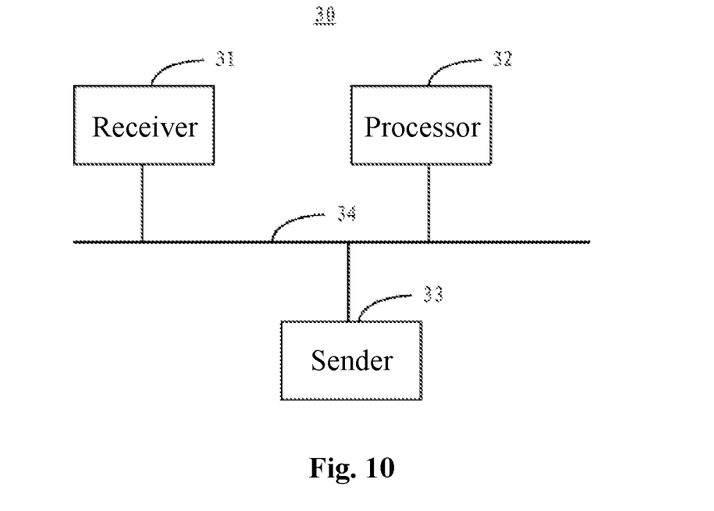
FIG. 10 is a structural schematic diagram of a communication device according to the second embodiment of the present invention.

FIG. 10 is a structural schematic diagram of a communication device according to a second embodiment of the present invention. As shown in FIG. 10, the communication device 30 comprise: a receiver 31, a processor 32, a sender 33 and a data bus 34. The receiver 31, the processor 32, and the sender 33 are connected through the data bus 34 for mutual communication. The sender 33 is configured to send a pull-up signaling to at least one communication terminal, the pull-up signaling comprising an uplink channel, a time slot, and a pull-up policy allocated by the communication device 30; and the processor 32 is configured to generate the pull-up signaling. The receiver 31 is configured to receive data uploaded by the at least one communication terminal using the uplink channel on the time slot according to the pull-up policy. The data comprises feature information of a subsequent pull-up, and the feature information is used for the communication device 30 to adjust at least one of the subsequent pull-up time and the subsequent pull-up policy.

Optionally, the uplink channel may be any idle channel in a current system. The pull-up policy comprises at least one of a single upload policy and a multiple upload policy. The single upload policy is that the communication device 30 only pulls up data of one communication terminal once, that is, the communication device 30 sends the pull-up signaling once, and one communication terminal uploads data to the communication device 30 according to the pull-up signaling.

Optionally, the multiple upload policy comprises at least one of a first multiple upload policy and a second multiple upload policy. The single upload policy is that the communication device 30 sends a pull-up signaling once, and multiple communication terminals upload data to the communication device 30 according to the pull-up signaling, i.e., one group of communication terminals is pulled up in the meanwhile. When the multiple upload policy is the first multiple upload policy, the pull-up signaling further comprises upload multi-frames and time slot numbers allocated by the communication device 30 and respectively corresponding to the multiple communication terminals. The sender 33 is further configured to: send upload multi-frames and time slot numbers allocated by the communication device 30 to each communication terminal, so that each communication terminal determines the pull-up time according to a current multi-frame and the upload multi-frames and the time slot numbers allocated by the communication device 30, and switches to the allocated uplink channel to automatically upload the data. A destination address of the pull-up signaling is a group address.

The second multiple upload policy is that the communication device 30 sends a pull-up signaling once, and at least one communication terminal uploads data to the communication device 30 for multiple times, i.e., once pull-up is performed while the data is uploaded for multiple times. When the multiple upload policy is the second multiple upload policy, the pull-up signaling comprises an upload number of times and an upload period; and the receiver 31 is configured to receive the data automatically uploaded by the communication terminal on the allocated uplink channel according to the upload period until the upload number of times is reached. The second multiple upload policy may also be that the communication device 30 sends the pull-up signaling once, and multiple communication terminals respectively upload the data to the communication device 30 for multiple times.

In the embodiment of the present invention, the pull-up policy is adjusted to the multiple upload policy, i.e., the communication device 30 sends the pull-up signaling once, corresponding to multiple communication terminals uploading data to the communication device 30, or at least one communication terminal uploading data to the communication device 30 for multiple times, which can greatly reduce the number of pull-up signaling that the communication device 30 needs to transmit, thereby reducing the occupation of downlink resources and improving the pull-up capacity.

If the current uplink channel needs to be occupied by other high-priority services, the communication device 30 will re-allocate the uplink channel and adjust the pull-up policy according to the current uplink channel resource changes.

Optionally, the processor 32 is configured to adjust at least one of the pull-up time and the pull-up policy. The sender 33 is further configured to: send a new pull-up signaling to the communication terminal, the new pull-up signaling comprising an uplink channel re-allocated by the communication device 30 and at least one of the pull-up time and the pull-up policy adjusted, so that the communication terminal uploads the data according to the re-allocated uplink channel and at least one of the pull-up time and the pull-up policy adjusted. Specifically, before the processor 32 adjusts at least one of the pull-up time and the pull-up policy, the data uploaded by the communication terminal received by the receiver 31 comprises feature information of increasing the pull-up frequency or decreasing the pull-up frequency, or the processor 32 detects that the uplink channel resources become busy or idle. If the data uploaded by the communication terminal received by the receiver 31 comprises feature information of increasing the pull-up frequency, or the processor 32 detects that the uplink channel resources become idle, then the new pull-up signaling sent by the sender 33 to the communication terminal comprises a pull-up policy of increasing the pull-up frequency. If the data uploaded by the communication terminal received by the receiver 31 comprises feature information of decreasing the pull-up frequency, or the processor 32 detects that the uplink channel resources become busy, then the new pull-up signaling sent by the sender 33 to the communication terminal comprises a pull-up policy of decreasing the pull-up frequency. In this manner, to adjust the actual pull-up period and the pull-up policy according to the current channel resource conditions and the feature information uploaded by the communication terminal can minimize the invalid occupation of the uplink channel resources, and further improve the data pull-up use effects.

Figure 11:
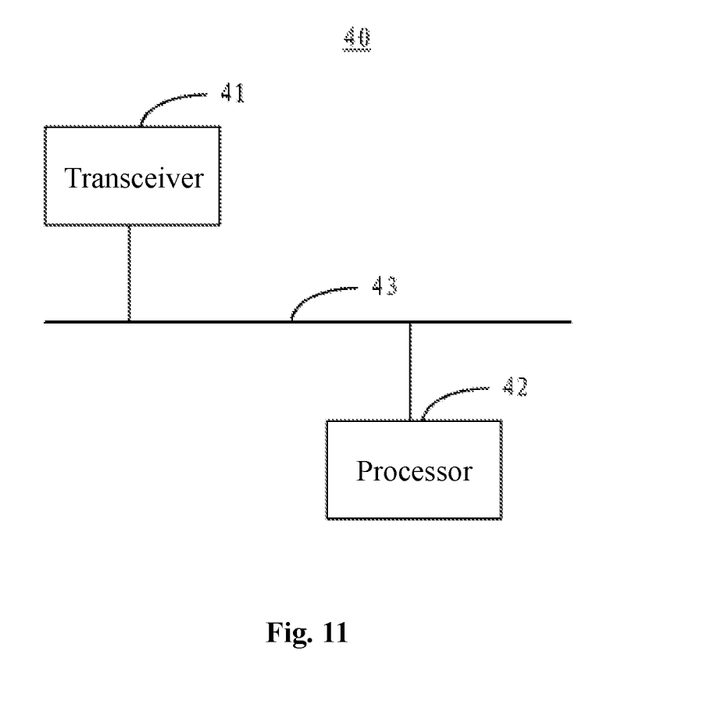
FIG. 11 is a structural schematic diagram of a communication terminal according to the second embodiment of the present invention.

FIG. 11 is a structural schematic diagram of a communication terminal according to the second embodiment of the present invention. As shown in FIG. 11, the communication terminal 40 comprises: a transceiver 41, a processor 42 and a data bus 43, wherein the transceiver 41 and the processor 42 are connected through the data bus 43 for mutual communication; and the transceiver 41 is configured to receive a pull-up signaling sent by a communication device. The pull-up signaling comprises an uplink channel, a time slot, and a pull-up policy allocated by the communication device. The processor 42 is configured to respond to the pull-up signaling and upload data to the communication device using the uplink channel on the time slot according to the pull-up policy. The data comprises feature information of a subsequent pull-up, so that the communication device adjusts at least one of a subsequent pull-up time and a subsequent pull-up policy according to the feature information.

Optionally, the feature information is obtained according to a moving speed of the communication terminal. For example, if the moving speed of the communication terminal is faster, the feature information may indicate to increase the pull-up period. If the moving speed of the communication terminal becomes slower, the feature information may indicate to decrease the pull-up period. The uplink channel may be any idle channel in a current system. The pull-up policy comprises at least one of a single upload policy and a multiple upload policy. The single upload policy is that the communication device only pulls up data of one communication terminal 40 once, that is, the communication device sends the pull-up signaling once, and one communication terminal 40 uploads data to the communication device according to the pull-up signaling.

Optionally, the multiple upload policy comprises at least one of a first multiple upload policy and a second multiple upload policy, wherein the first multiple upload policy is that the communication device sends the pull-up signaling once, and multiple communication terminals 40 upload the data to the communication device according to the pull-up signaling, i.e., one group of communication terminals 40 is pulled up at the same time. When the multiple upload policy is the first multiple upload policy, the pull-up signaling further comprises upload multi-frames and time slot numbers allocated by the communication device and respectively corresponding to the multiple communication terminals 40. The transceiver 41 is further configured to receive the upload multi-frames and the time slot numbers allocated by the communication device. The processor 42 determines the pull-up time according to the current multi-frame, the allocated upload multi-frames and the time slot numbers, and then switches to the allocated channel to automatically upload the data. A destination address of the pull-up signaling is a group address. Each upload multi-frame comprises multiple time slots. If the processor 42 directly uploads data on a time slot next to the time slot receiving the pull-up signaling, then a unique pull-up time may be determined according to the current multi-frame and the allocated upload multi-frames. If the processor 42 does not directly upload the data on the time slot next to the time slot receiving the pull-up signaling, then the processor 42 needs to determine the pull-up time according to the current multi-frame, the allocated upload multi-frames and the time slot numbers.

The second multiple upload policy is that the communication device sends a pull-up signaling once, and at least one communication terminal 40 uploads data to the communication device, i.e., once pull-up is performed while the data is uploaded for multiple times. When the multiple upload policy is the second multiple upload policy, the pull-up signaling further comprises an upload number of times and an upload period. The processor 42 is configured to: automatically upload the data to the communication device on the allocated uplink channel according to the upload period until the upload number of time is reached, then automatically stop uploading, and wait for next pull-up signaling. The second multiple upload policy may also be that the communication device sends the pull-up signaling once, and multiple communication terminals 40 respectively upload the data to the communication device for multiple times.

In the embodiment of the present invention, the pull-up policy is adjusted to the multiple upload policy, i.e., the communication device sends the pull-up signaling once, corresponding to multiple communication terminals 40 uploading data to the communication device, or at least one communication terminal 40 uploading data to the communication device for multiple times, which can greatly reduce the number of pull-up signaling that the communication device needs to transmit, thereby reducing the occupation of downlink resources and improving the pull-up capacity.

If the current uplink channel needs to be occupied by other high-priority services, the processor 42 needs to upload data according to the pull-up policy re-adjusted by the communication device. Optionally, the transceiver 41 is further configured to receive a new pull-up signaling sent by the communications device. The new pull-up signaling comprises the uplink channel re-allocated by the communication device according to the learned channel resource changes and the adjusted pull-up policy. The processor 42 uploads the data to the communication device according to the re-allocated uplink channel and the adjusted pull-up policy. If the data uploaded last time by the processor 42 comprises feature information of increasing the pull-up frequency, or the communication device detects that the uplink channel resources become idle, then the new pull-up signaling received by the transceiver 41 comprises a pull-up policy of increasing the pull-up frequency. If the data uploaded last time by the processor 42 comprising feature information of decreasing the pull-up frequency, or the communication device detects that the uplink channel resources become busy, then the new pull-up signaling received by the transceiver 41 comprises a pull-up policy of decreasing the pull-up frequency. Then, the processor 42 uploads the data to the communication device according to the above pull-up policy. In this manner, to adjust the actual pull-up period and the pull-up policy according to the current channel resource conditions and the feature information uploaded by the communication terminal 40 can minimize the invalid occupation of the uplink channel resources, and further improve the data pull-up use effects.

In conclusion, the present invention sends the pull-up signaling to at least one communication terminal through the communication device, the pull-up signaling comprising the uplink channel, the time slot, and the pull-up policy allocated by the communication device; and the communication device receives the data uploaded by the at least one communication terminal using the uplink channel on the time slot according to the pull-up policy, the data comprising the feature information of the subsequent pull-up, and the feature information being used for the communication device to adjust at least one of the subsequent pull-up time and the subsequent pull-up policy, which can greatly improve the channel utilization rate and data pull-up capacity, and improve the data pull-up use effects.

The foregoing descriptions are merely embodiments of the present invention, but are not intended to limit the patent scope of the present invention. All equivalent structures or equivalent flow transformations made using the description of the present invention and the accompanying drawings, or being used directly or indirectly in other related technical fields, are similarly within the protection scope of the present invention.

What is claimed is:

1. A data pull-up method for dynamically allocating an uplink channel, comprising:
   sending, by a communication device, a pull-up signaling to at least one communication terminal, the pull-up signaling comprising an uplink channel, a time slot, and a pull-up policy allocated by the communication device; and
   receiving, by the communication device, data uploaded by the communication terminal using the uplink channel on the time slot according to the pull-up policy, the data comprising feature information of a subsequent pull-up, and the feature information being used for the communication device to adjust at least one of a subsequent pull-up time and a subsequent pull-up policy.

2. The method according to claim 1, wherein the pull-up policy comprises a multiple upload policy, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

3. The method according to claim 2, wherein when the multiple upload policy is the first multiple upload policy, the pull-up signaling comprises upload multi-frames and time slot numbers allocated by the communication device and respectively corresponding to the multiple communication terminals; and
   the step of the sending, by a communication device, a pull-up signaling to at least one communication terminal specifically comprises:
   sending, by the communication device, the upload multi-frames and the time slot numbers allocated by the communication device to each of the communication terminals, so that each of the communication terminals use a current multi-frame and the upload multi-frames and the time slot numbers to determine pull-up time.

4. The method according to claim 2, wherein when the multiple upload policy is the second multiple upload policy, the pull-up signaling comprises an upload number of times and an upload period; and
   the step of the receiving, by the communication device, data uploaded by the at least one communication terminal using the uplink channel on the time slot according to the pull-up policy specifically comprises:
   receiving, by the communication device, the data automatically uploaded by the communication terminal on the uplink channel according to the upload period until the upload number of times is reached.

5. The method according to claim 1, further comprising:
   adjusting, by the communication device, at least one of the pull-up time and the pull-up policy; and
   sending, by the communication device, a new pull-up signaling to the communication terminal, the new pull-up signaling comprising an uplink channel re-allocated by the communication device and at least one of the pull-up time and the pull-up policy adjusted, so that the communication terminal uploads the data according to the re-allocated uplink channel and at least one of the pull-up time and the pull-up policy adjusted.

6. The method according to claim 5, wherein the adjusting, by the communication device, at least one of the pull-up time and the pull-up policy comprises:
   receiving, by the communication device, the data uploaded by the communication terminal comprising feature information of increasing the pull-up frequency or decreasing the pull-up frequency, and dynamically adjusting at least one of the subsequent pull-up time and the subsequent pull-up policy according to the feature information; or
   detecting, by the communication device, that the uplink channel resources become busy or idle, and dynamically adjusting at least one of the subsequent pull-up time and the subsequent pull-up policy according to the uplink channel resource changes.

7. A communication device, comprising:
a sending module, configured to send a pull-up signaling to at least one communication terminal, the pull-up signaling comprising an uplink channel, a time slot, and a pull-up policy allocated by the communication device; and
a first receiving module, connected with the sending module and configured to receive data uploaded by the at least one communication terminal using the uplink channel on the time slot according to the pull-up policy, the data comprising feature information of a subsequent pull-up, and the feature information being used for the communication device to adjust at least one of a subsequent pull-up time and a subsequent pull-up policy.

8. The communication device according to claim 7, further comprising an adjusting module, wherein the adjusting module is configured to adjust at least one of a pull-up time and a pull-up policy; and the sending module is further configured to: send a new pull-up signaling to the communication terminal, the new pull-up signaling comprising an uplink channel re-allocated by the communication device and at least one of the pull-up time and the pull-up policy adjusted, so that the communication terminal uploads the data according to the re-allocated uplink channel and at least one of the pull-up time and the pull-up policy adjusted.

9. The communication device according to claim 8, further comprising a detecting module, wherein before the adjusting module is configured to adjust at least one of the pull-up time and the pull-up policy, the data uploaded by the communication terminal received by the first receiving module comprises feature information of increasing the pull-up frequency or decreasing the pull-up frequency; or, the detecting module detects that the uplink channel resources become busy or idle.

10. A communication device, comprising: a receiver, a processor, a sender and a data bus, wherein the receiver, the processor and the sender are connected through the data bus for mutual communication;
the sender is configured to send a pull-up signaling to at least one communication terminal, the pull-up signaling comprising an uplink channel, a time slot, and a pull-up policy allocated by the communication device; and the processor is configured to generate the pull-up signaling; and
the receiver is configured to receive data uploaded by the at least one communication terminal using the uplink channel on the time slot according to the pull-up policy, the data comprising feature information of a subsequent pull-up, and the feature information being used for the communication device to adjust at least one of the subsequent pull-up time and the subsequent pull-up policy.

11. The communication device according to claim 10, wherein the pull-up policy comprises a multiple upload policy, and the multiple upload policy comprises at least one of a first multiple upload policy and a second multiple upload policy, the first multiple upload policy is that the communication device sends the pull-up signaling once, and multiple communication terminals upload the data to the communication device according to the pull-up signaling; and the second multiple upload policy is that the communication device sends the pull-up signaling once, and the at least one communication terminal uploads the data to the communication device for multiple times.

* * * * *